(12) United States Patent
Bull et al.

(10) Patent No.: US 10,540,440 B2
(45) Date of Patent: *Jan. 21, 2020

(54) RELATION EXTRACTION USING Q AND A

(71) Applicant: INTERNATIONAL BUSINESS MACHINES CORPORATION, Armonk, NY (US)

(72) Inventors: Brendan C. Bull, Durham, NC (US); Scott R. Carrier, Apex, NC (US); Aysu Ezen Can, Cary, NC (US); Dwi Sianto Mansjur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/613,469

(22) Filed: Jun. 5, 2017

(65) Prior Publication Data

US 2018/0349342 A1    Dec. 6, 2018

(51) Int. Cl.
| | |
|---|---|
| *G06F 17/27* | (2006.01) |
| *G06F 16/242* | (2019.01) |
| *G06F 16/28* | (2019.01) |
| *G06F 16/36* | (2019.01) |
| *G06F 16/33* | (2019.01) |
| *G06F 16/332* | (2019.01) |

(52) U.S. Cl.
CPC .......... *G06F 17/271* (2013.01); *G06F 16/243* (2019.01); *G06F 16/288* (2019.01); *G06F 16/3329* (2019.01); *G06F 16/3344* (2019.01); *G06F 16/36* (2019.01)

(58) Field of Classification Search
CPC ....... G06F 17/271; G06F 16/243; G06F 16/36
See application file for complete search history.

(56) References Cited

U.S. PATENT DOCUMENTS

| 6,131,085 A | 10/2000 | Rossides |
| 9,245,010 B1 | 1/2016 | Donneau-Golencer et al. |
| | | (Continued) |

OTHER PUBLICATIONS

IBM: List of IBM Patents or Patent Applications Treated As Related (Appendix P), Feb. 6, 2018, pp. 1-2.

(Continued)

*Primary Examiner* — Loc Tran
(74) *Attorney, Agent, or Firm* — Kristofer L. Haggerty

(57) ABSTRACT

Embodiments of the present invention disclose a method, a computer program product, and a computer system for extracting natural language relations between entities. A computer receives a configuration for associating one or more natural language questions with one or more entities and identifies the one or more entities annotated within a document. The computer answers the natural language questions associated with the identified one or more entities based on context surrounding the identified one or more entities. The computer may further transmit the natural language questions associated with the identified one or more entities and the surrounding context to a question and answer service, then receive answers to the natural language questions from the question and answer service. The computer may further determine whether the received answers correctly describe the relation between the identified one or more entities and other entities within the extracted surrounding context.

14 Claims, 6 Drawing Sheets

(56) References Cited

U.S. PATENT DOCUMENTS

| | | |
|---|---|---|
| 2004/0219494 A1 | 11/2004 | Boon |
| 2007/0124291 A1 | 5/2007 | Hassan et al. |
| 2010/0082331 A1 | 4/2010 | Brun et al. |
| 2011/0307435 A1 | 12/2011 | Overell et al. |
| 2015/0112981 A1* | 4/2015 | Conti .................... G06F 16/951 707/730 |
| 2016/0092448 A1* | 3/2016 | Byron ................. G06F 16/3344 707/739 |
| 2016/0140958 A1 | 5/2016 | Heo et al. |
| 2016/0189300 A1 | 6/2016 | Byron et al. |
| 2016/0371385 A1 | 12/2016 | Keysar et al. |
| 2017/0255694 A1 | 9/2017 | Byron et al. |
| 2017/0337268 A1* | 11/2017 | Ait-Mokhtar ............ G06N 5/02 |
| 2018/0157741 A1 | 6/2018 | Allen et al. |

OTHER PUBLICATIONS

Bull et al., U.S. Appl. No. 15/889,349, filed Feb. 6, 2018, titled "Relation Extraction Using Q&A," pp. 1-36.

Bach et al., "A Review of Relation Extraction," Source: 2007 (Best date available), essex.ac.uk, Publisher: Carnegie Mellon University, pp. 1-15.

Mell et al., "The NIST Definition of Cloud Computing," National Institute of Standards and Technology, U.S. Department of Commerce, Special Publication 800-145, Sep. 2011, pp. 1-7.

\* cited by examiner

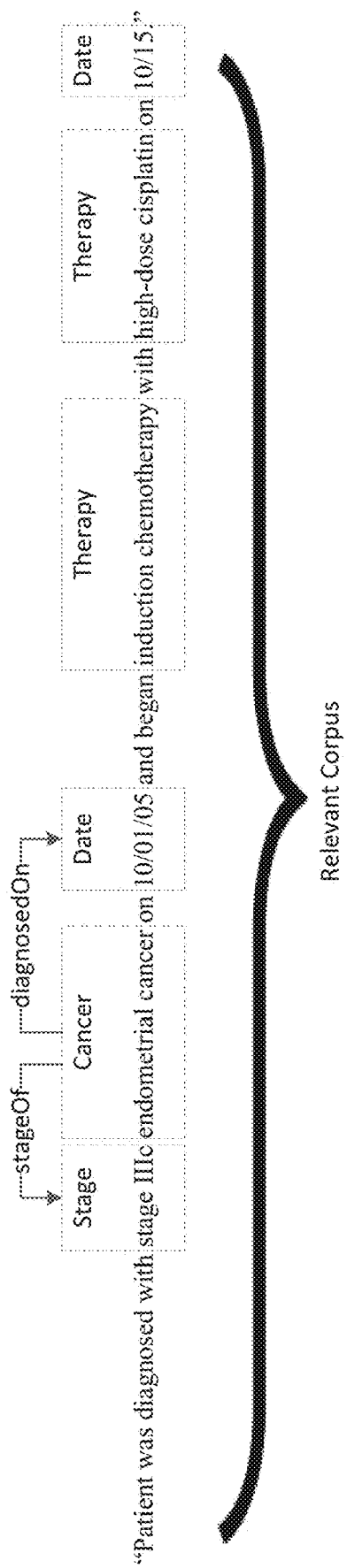
Figure 2
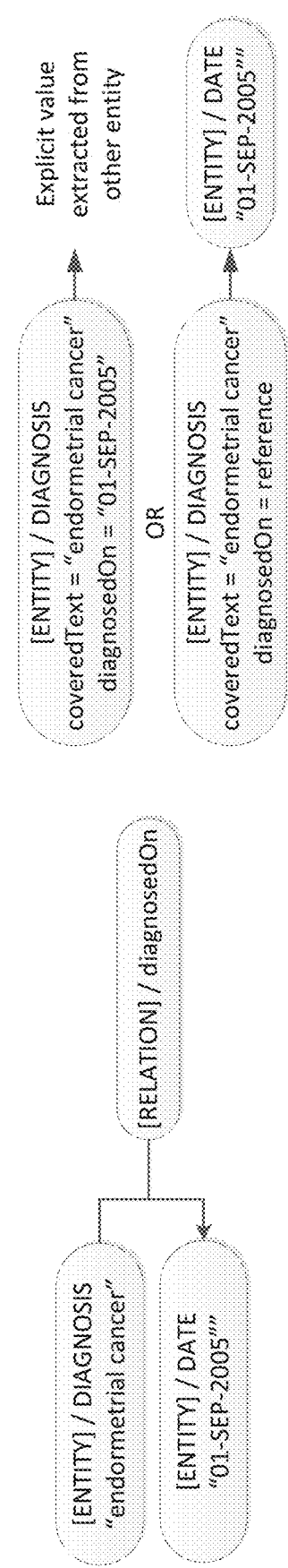
Figure 3
Figure 4

RELATION EXTRACTION USING Q AND A

TECHNICAL FIELD

The present invention relates to structuring data, and more particularly to defining relations between entities using a question and answer (Q&A) system.

BACKGROUND

Extracting natural language processing (NLP) relations from entities in unstructured data is commonly performed by either training a machine learning model or crafting a set of NLP rules, each of which having their advantages and disadvantages. Training a machine learning model is time consuming in that labelled data must be curated to train the model and iteratively trained until sufficiently accurate. On the other hand, NLP rules can be quickly written, but expensive to maintain over time in the sense that skilled NLP developers are typically required for developing and maintaining these rule sets.

SUMMARY

Embodiments of the present invention disclose a method, a computer program product, and a computer system for extracting entity relations via a question and answer service. A computer identifies an entity annotated within a document, then extracts a portion of content in close proximity to the identified entity. In some embodiments, the portion of content comprises a sentence containing the identified entity. The computer determines one or more relations describing an association between the identified entity and one or more other entities within the extracted portion of content based on answering one or more questions associated with the identified entity and the portion of content. Further embodiments of the present invention include annotating the document with the determined one or more relations.

In addition, embodiments of the present invention may include determining the one or more relations describing the association between the identified entity and the one or more other entities within the extracted portion of content by transmitting the extracted portion of content and the one or more questions associated with the identified entity to a question and answer service. Moreover, the computer may receive the one or more relations based on the question and answer service answering the one or more questions.

In further embodiments of the present invention, the computer may identify one or more other entities within the extracted portion of content. The computer may then determine the one or more relations by answering the one or more questions associated with the identified entity based on the portion of content and the identified one or more other entities.

Embodiments of the present invention may further include determining whether the received one or more relations correctly describe the association between the identified entity and the one or more other entities by determining whether at least one of the received one or more relations correspond to the entity class associated with the at least one of the one or more questions.

BRIEF DESCRIPTION OF THE SEVERAL VIEWS OF THE DRAWINGS

FIG. 2 illustrates an example annotated sentence, in accordance with an embodiment of the present invention.

FIG. 3 is a schematic diagram graphically illustrating entity relations denoted by annotation, in accordance with an embodiment of the present invention.

FIG. 4 is a schematic diagram graphically illustrating entity relations denoted by attribute, in accordance with an embodiment of the present invention.

DETAILED DESCRIPTION

Figure 1:
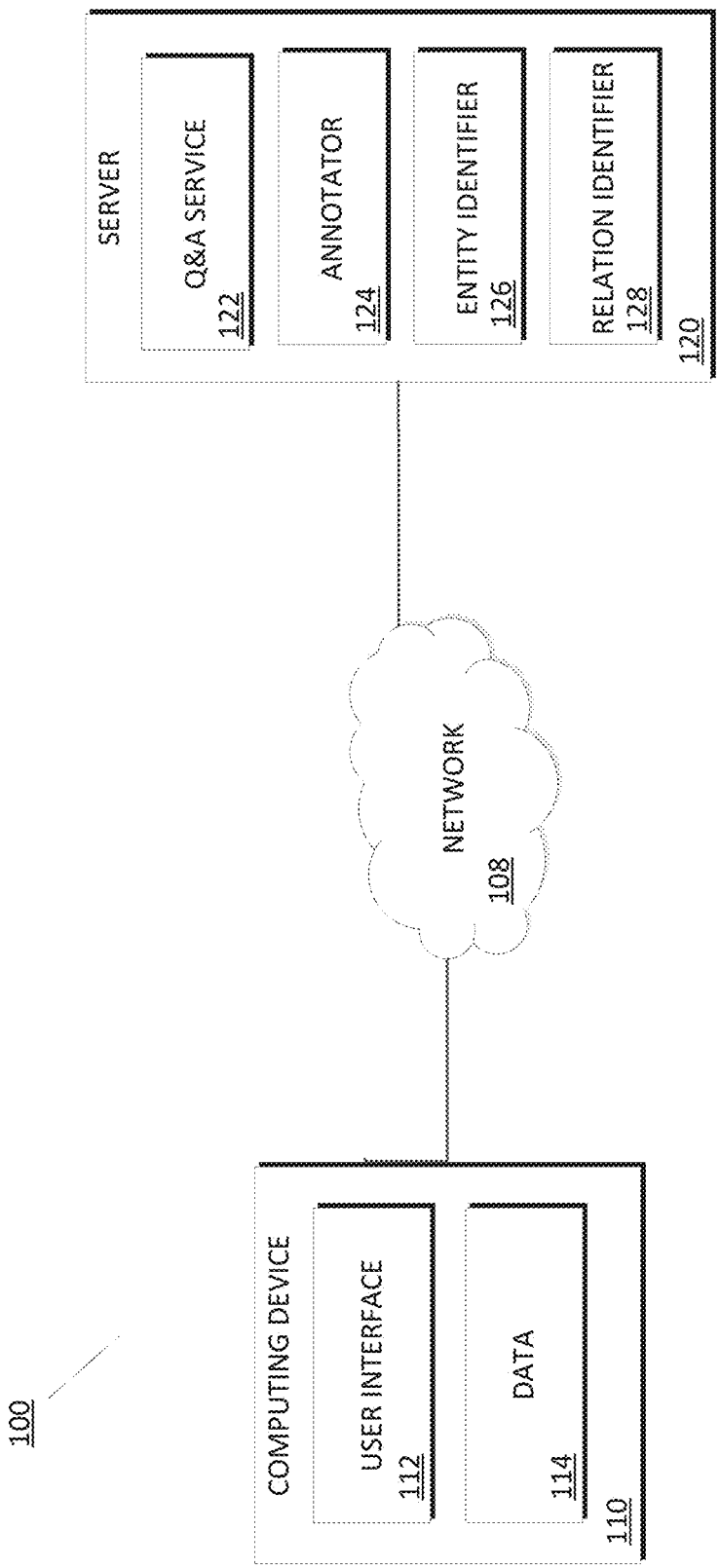
FIG. 1 is a schematic diagram of an entity relation extraction system 100, in accordance with an embodiment of the present invention.

An entity relation extraction system 100 in accordance with an embodiment of the invention is illustrated by FIG. 1. The present invention utilizes a question and answer service to identify relations between entities by preconfiguring questions corresponding to entities. When an entity is identified, the entity, its surrounding context, and preconfigured questions are transmitted to a question and answer service which then identifies the relation by answering the preconfigured question based on the surrounding context.

In the example embodiment, network 108 is a communication channel capable of transferring data between connected devices. In the example embodiment, network 108 may be the Internet, representing a worldwide collection of networks and gateways to support communications between devices connected to the Internet. Moreover, network 108 may include, for example, wired, wireless, or fiber optic connections which may be implemented as an intranet network, a local area network (LAN), a wide area network (WAN), or any combination thereof. In further embodiments, network 108 may be a Bluetooth network, a WiFi network, or a combination thereof. In yet further embodiments, network 108 may be a telecommunications network used to facilitate telephone calls between two or more parties comprising a landline network, a wireless network, a closed network, a satellite network, or any combination thereof. In general, network 108 can be any combination of connections and protocols that will support communications between computing device 110 and server 120.

In the example embodiment, computing device 110 includes user interface 112 and data 114. Computing device 110 may be a laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 6.

User interface 112 is a software application which allows a user of computing device 110 to interact with computing device 110 as well as other connected devices via network 108. In addition, user interface 112 may be connectively coupled to hardware components, such as those depicted by FIG. 6, for receiving user input, including mice, keyboards, touchscreens, microphones, cameras, and the like. In the example embodiment, user interface 112 is implemented via a web browsing application containing a graphical user interface (GUI) and display that is capable of transferring data files, folders, audio, video, hyperlinks, compressed data, and other forms of data transfer individually or in bulk. In other embodiments, user interface 112 may be implemented via other integrated or standalone software applications and hardware capable of receiving user interaction and communicating with other electronic devices.

Data 114 is a collection of information contained in files, folders, and other documents. In the example embodiment, data 114 may be a corpora of documents which detail bodies of categorized and subject specific data, such as medical, legal, and financial data. In other embodiments, data 114 may include uncategorized data of miscellaneous topics. In the example embodiment, data 114 may be structured (i.e. have associated metadata), partially structured, or unstructured. Moreover, data within data 114 may be written in programming languages of common file formats such as .docx, .doc, .pdf, .rtf, etc. In other embodiments, data 114 may include handwritten and other documents scanned or otherwise converted into electronic form.

In the example embodiment, server 120 includes Q&A service 122, annotator 124, entity identifier 126, and relation identifier 128. Server 120 may be a laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While server 120 is shown as a single device, in other embodiments, server 120 may be comprised of a cluster or plurality of computing devices, working together or working separately. Server 120 is described in more detail with reference to FIG. 6.

Q&A service 122 is a question and answer software application configured to receive questions and provide one or more answers to the received questions. In the example embodiment, Q&A service 122 receives questions in the form of natural language, for example written or spoken human language. In other embodiments, Q&A service 122 may receive structured questions, for example questions written in structured query language (SQL). While in the example embodiment Q&A service 122 is a standalone application on server 120, in other embodiments, Q&A service 122 may be integrated with relation identifier 128 partially or in entirety such relation identifier 128 additionally performs the operations of Q&A service 122. In the example embodiment, Q&A service 122 determines answers to the received questions by reference to a database or corpus of information and, in some embodiments, may provide confidence levels corresponding to particular answers such that the answers are ranked according to a likelihood of applicability. In some illustrative embodiments, Q&A service 122 may be the Watson™ QA system available from International Business Machines Corporation of Armonk, N.Y., which is briefly described in the proceeding paragraphs.

The Watson™ QA system may receive an input question which it then parses to extract the major features of the question, that in turn are then used to formulate queries that are applied to a corpus of data. Based on the application of the queries to the corpus of data, a set of hypotheses, or candidate answers to the input question, are generated by looking across the corpus of data for portions of the corpus of data that have some potential for containing a valuable response to the input question. The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal, syntactical, or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Annotator 124 is a software application capable of annotating selections of data, such as selections of data contained in data 114. In the example embodiment, annotator 124 is capable of annotating entities, relations between entities, and other annotations or metadata made to text and data. In the example embodiment, annotator 124 applies annotations as metadata, however in other embodiments, annotations may be applied otherwise. For example, FIG. 2 illustrates an example annotated sentence which has been annotated by an annotator similar to annotator 124.

In the example embodiment, entity identifier 126 is a software application capable of performing named entity recognition (NER) and other entity identification techniques such as entity chucking and entity extraction. Entity identifier 126 locates named entities within data 114 and classifies them into pre-defined categories such as the names of persons, organizations, locations, expressions of times, quantities, monetary values, percentages, and the like. For example, FIG. 2 illustrates an example sentence wherein the identified entities are annotated with the classes: "Stage," "Cancer," "Date," "Therapy," and "Agent." In the example embodiment, entities may be classified broadly to cover a large scope, such as "Diagnosis," or classified narrowly to cover a lesser scope, such as "Cancer."

In the example embodiment, relation identifier 128 is a software application capable of identifying relations between entities. Relations describe how one entity has to do with another, such as how a date of diagnosis describes the relation between a date entity and a diagnosis entity. In the example embodiment, relations can be expressed by either a relation annotation or as an attribute of the entities themselves. For example, FIG. 3 illustrates the relation annotation, "diagnosedOn," relating a diagnosis entity, "endometrial cancer," and a date entity, "1 Sep. 2005." Alternatively, FIG. 4 illustrates the same diagnosis entity, "endometrial cancer," having the relation "diagnosedOn" as one of the attributes of the diagnosis entity itself. In the embodiment illustrated by FIG. 4, the attributed relation can be expressed as the value extracted from the date entity, "1 Sep. 2005," or as a reference to the date entity, "reference". In other embodiments, however, entities and relations may be expressed via other means.

In the example embodiment, relation identifier 128 is capable of receiving a configuration detailing entities and natural language questions associated with the entities. Relation identifier 128 is further capable of receiving data and identifying the annotated entities of the data. In addition, relation identifier 128 is capable of transmitting the natural language questions associated with the identified entities and a corpus of information relevant to the entity to a question and answer service. Moreover, relation identifier 128 is further capable of receiving a relation corresponding to the identified entities from the question and answer service and transmitting the received relations to an annotator.

Figure 5:
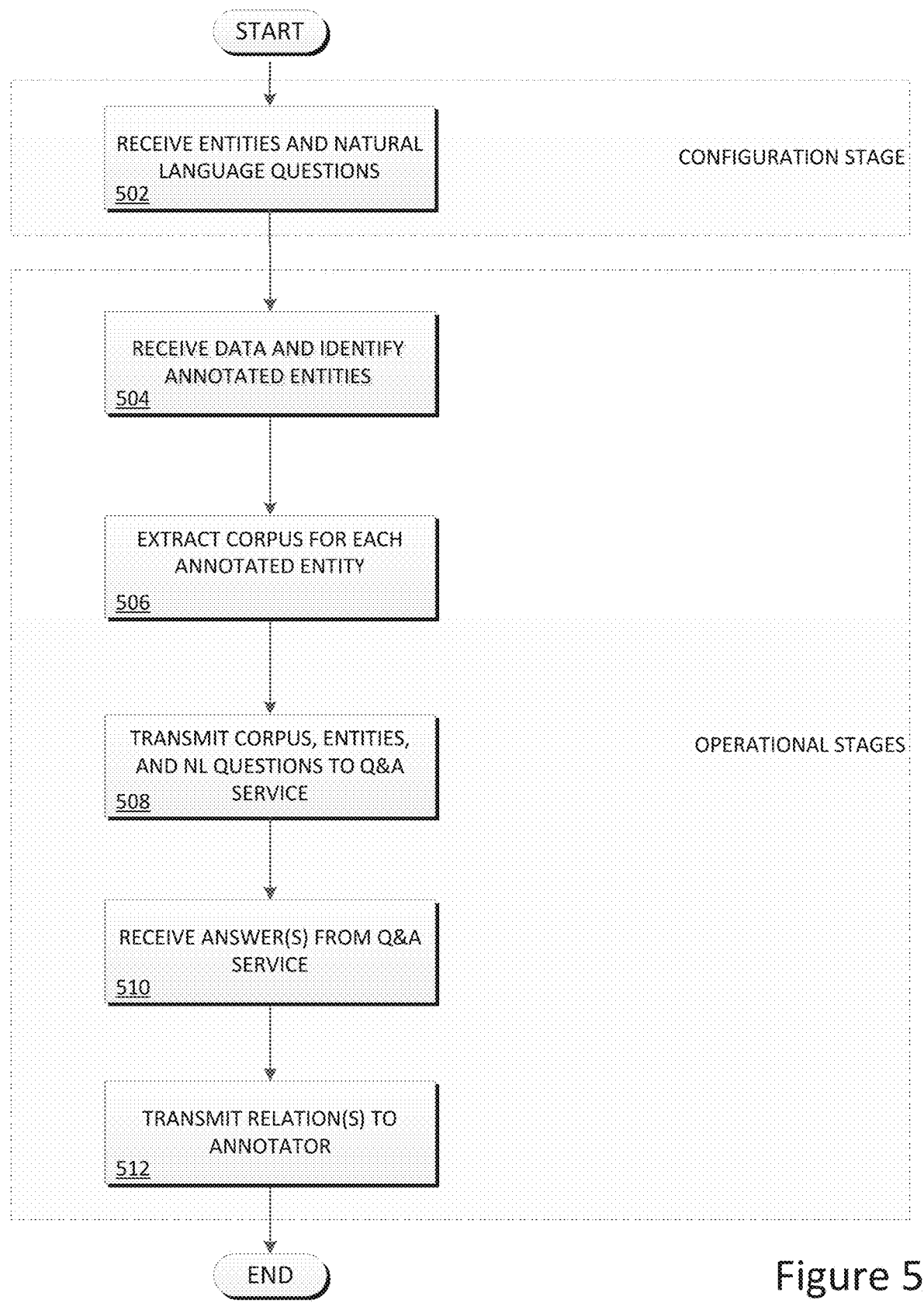
FIG. 5 is a schematic diagram illustrating the operations of relation identifier 128 of entity relation extraction system 100 in extracting entity relations via a question and answer service, in accordance with an embodiment of the present invention.

FIG. 5 illustrates the operations of relation identifier 128 of entity relation extraction system 100 in extracting entity relations via a question and answer service. In the example embodiment, relation identifier 128 determines a relation between entities by submitting preconfigured, entity-based questions and the context surrounding the entities to a question and answer system. In the example embodiment, the configuration stage comprises step 502 and the operational stage comprises steps 504-512.

In the example embodiment, the configuration stage comprises relation identifier 128 receiving entities and natural language questions associated with the entities (step 502). In the example embodiment, relation identifier 128 receives the entities and natural language questions associated with the entities from a user through user interface 112 of computing device 110 via network 108. In other embodiments, however, relation identifier 128 may receive entities and natural language questions associated with the entities via other means and/or at other stages of operation. In the example embodiment, entities and/or entity classes are associated with questions for which the answers are likely to be found in the textual context surrounding the entity. In addition, the natural language questions are configured such that the answers to the questions are intended to define relations between the entity and other surrounding context or entities. For example, entities classified as Cancer may be associated with the question "When was the cancer diagnosed?" to determine if the Cancer entity has a diagnosis date relation (diagnosedOn) with a Date entity of the same sentence. Similarly, Cancer entities may be associated with the question "What is the stage of the cancer?" to determine if the Cancer entity has a cancer stage relation (stageOf) with a Stage entity of the same sentence. In other embodiments, the configured questions may seek relations found elsewhere in the document or found in other documents altogether. Moreover, the configured questions may be directed toward classes of entities or specific entities. For example, while Cancer entities may be associated with a question regarding a diagnosis date, Skin Cancer entities may be associated with a question as to where the skin cancer is located on the body.

Relation identifier 128 receives data and identifies the annotated entities within the data (step 504). In the example embodiment, relation identifier 128 receives data 114 via network 108 and identifies the annotated entities by analysing metadata associated with data 114. In the example embodiment, the metadata associated with data 114 includes information detailing which annotations are applied to which text as well as what kind of annotation is applied. Relation identifier 128 then compares the identified entities to the preconfigured entities to determine which preconfigured entities are identified within data 114. With reference to FIG. 2 for an illustrative example, if relation identifier 128 receives data 114 containing the sentence "Patient was diagnosed with stage IIIC endometrial cancer on Oct. 1, 2005 and began induction chemotherapy with high-dose cisplatin on October 15.", then relation identifier 128 identifies the entities of the classes Stage, Cancer, Date, Therapy, and Agent.

Relation identifier 128 extracts the relevant corpus for each of the identified, annotated entities (step 506). In the example embodiment, the corpus is a body of knowledge from which Q&A service 122 determines an answer to the preconfigured questions. In the example embodiment, the relevant corpus is a portion of content within a proximity of the identified annotated entity, for example an amount of characters or words in particular directions from the entity. For example, the relevant corpus may be fifty characters to both the left and right of the entity, overflowing to the next line on documents with edges. In addition, the relevant corpus may also include fifty characters up and down from the entity, for example forming a circle, square, or rectangle based on the amount of characters designated in each direction. Alternatively, the proximity may be defined by searching the surrounding language for the beginning and ends of sentences or paragraphs. For example, character recognition techniques may be used to identify capital letters and periods in succession or those which are divided by one or two spaces to determine the beginning and end of a sentence. For the purposes of the example embodiment, the relevant corpus is the entire sentence in which the annotated entity is found. In other embodiments, however, the relevant corpus may be strings of characters ranging from several letters or words to entire paragraphs, pages, and documents. With reference again to FIG. 2, if the relevant corpus is defined as the sentence containing the identified and annotated entity, then relation identifier 128 extracts "Patient was diagnosed with stage IIIC endometrial cancer on Oct. 1, 2005 and began induction chemotherapy with high-dose cisplatin on October 15."

Relation identifier 128 transmits the relevant corpus, the identified annotated entities, and natural language questions corresponding to the identified annotated entities to a question and answer service (step 508). In the example embodiment, relation identifier 128 transmits the corpus, annotated entities, and natural language questions to Q&A service 122 locally on server 120. In other embodiments, however, the corpus, entities, and natural language questions may be transmitted to remote devices containing Q&A service 122. In the example embodiment, relation identifier 128 transmits all identified entities within the relevant corpus to Q&A service 122 in an attempt to improve results. In other embodiments, however, relation identifier 128 may transmit plain text or partial annotations of data 114. In addition, while in the example embodiment the relevant corpus is the entire sentence, in other embodiments the relevant corpus may be lesser in length, such as specific characters or words, or greater in length, such as entire paragraphs, pages, and documents. With reference to the above example illustrated by FIG. 2 where relation identifier 128 identifies a Cancer entity, then relation identifier 128 transmits to Q&A service 122 the relevant corpus: "Patient was diagnosed with stage IIIC endometrial cancer on Oct. 1, 2005 and began induction chemotherapy with high-dose cisplatin on October 15."; the annotated entities in the relevant corpus: Stage, Cancer, Date, Therapy, and Agent; and natural language questions: "What is the stage of the cancer?" and "When was the cancer diagnosed?"

Relation identifier 128 receives one or more answers from the question and answer service (step 510). In the example embodiment, relation identifier 128 receives one or more answers to the natural language questions transmitted to Q&A service 122. In the example embodiment, the answers may be ranked based on a likelihood of correctly identifying the sought relation. In other embodiments, however, relation identifier 128 may receive a single, synthesised answer from Q&A service 122. Continuing the example introduced above, if relation identifier 128 transmits the question "When was the cancer diagnosed?" to Q&A service 122, then relation identifier 128 receives the answer "Oct. 1, 2005" from Q&A service 122. Relation identifier 128 then determines whether the received answer(s) is indicative of a relation sought by the preconfigured natural language questions. For example, preconfigured natural language questions may be associated with an entity class likely to contain the sought relationship. In the example above, for instance, the question "When was the cancer diagnosed?" is likely to be answered by a Date class entity. Relation identifier 128 may also search the received answers for terms, keywords, or synonyms of the relation sought. If the received answer(s) do not correspond to the relation sought by the natural language question, then relation identifier 128 may utilize a next ranked answer when applicable, prompt user intervention to select or enter an appropriate relation, transmit a reworded question to Q&A service 122, or fall back on to other rules for identifying the correct relation, for example parsing or machine learning rules. Moreover, in the example embodiment, relation identifier 128 may provide means to eliminate answers which are deemed erroneous or non-applicable as well as apply greater weight to particular answers or reasoning algorithms for particular entities or relations. Furthermore, relation identifier 128 may record such actions and use them to further improve the training model and results of future queries.

Relation identifier 128 transmits the determined relation to an annotator (step 512). In the example embodiment, relation identifier 128 transmits the determined relations to annotator 124 locally in the form of either a relation annotation or as an attribute of a subject entity. In other embodiments, the relations may be transmitted in alternatively.

While the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

Figure 6:
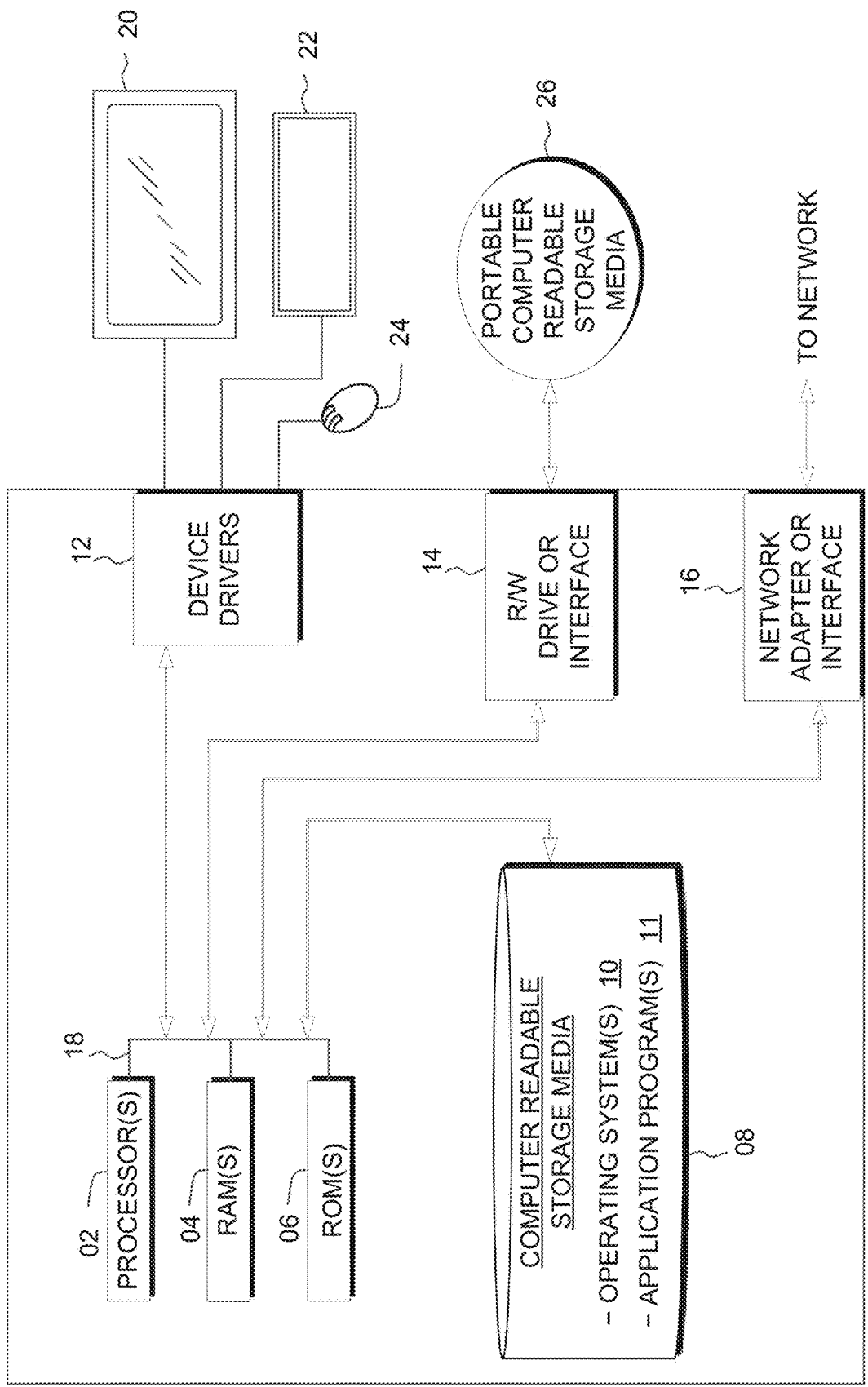
FIG. 6 is a block diagram depicting the hardware components of an entity relation extraction system 100 of FIG. 1, in accordance with an embodiment of the invention.

FIG. 6 depicts a block diagram of components of host devices and data storage devices of the entity relation extraction system 100 of FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example relation identifier 128, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
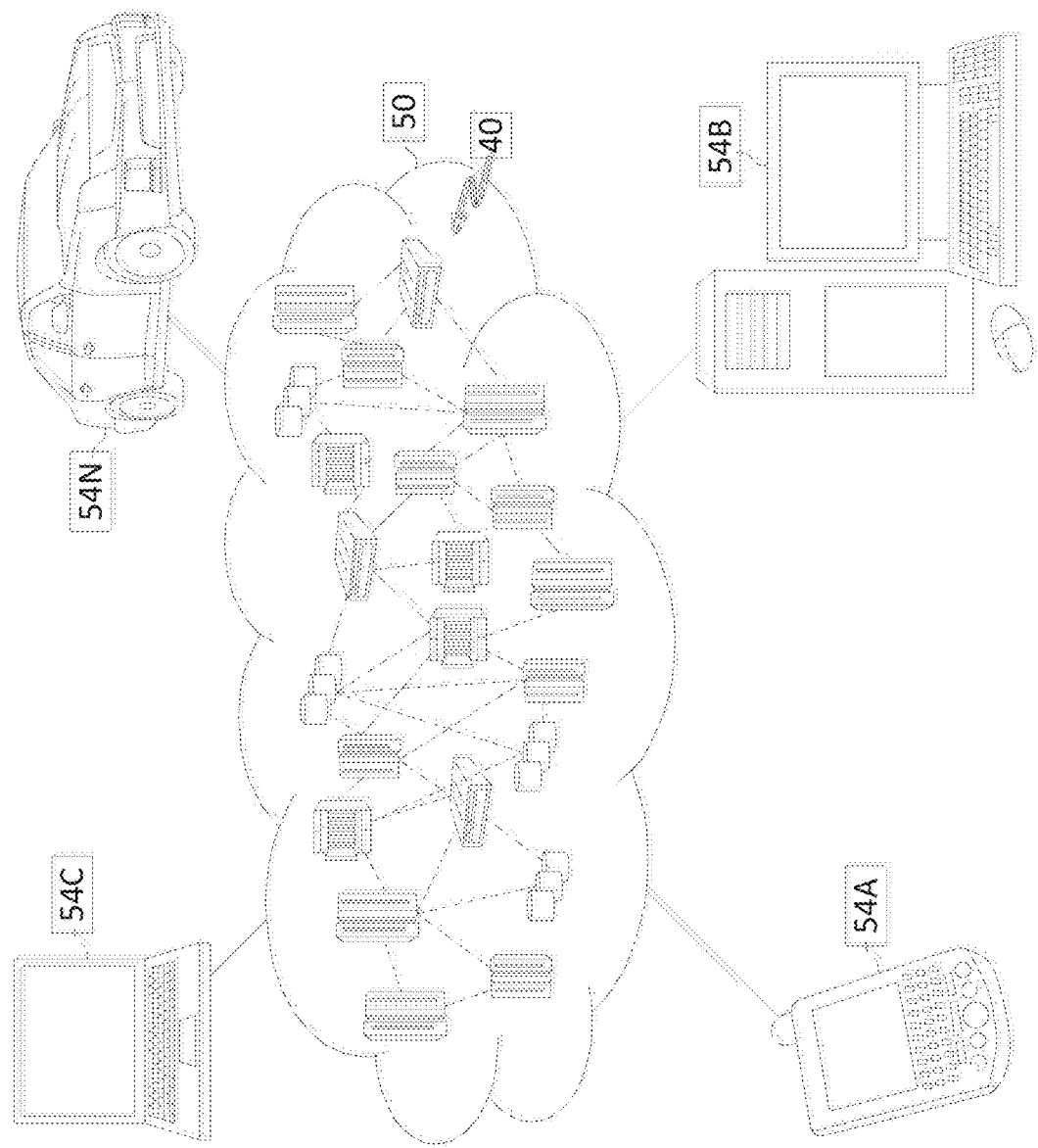
FIG. 7 depicts a cloud computing environment, in accordance with an embodiment of the present invention.

Referring now to FIG. 7, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 40 and cloud computing environment 50 can communicate with any type of computerized device over any type of network and/or network addressable connection (e.g., using a web browser).

Figure 8:
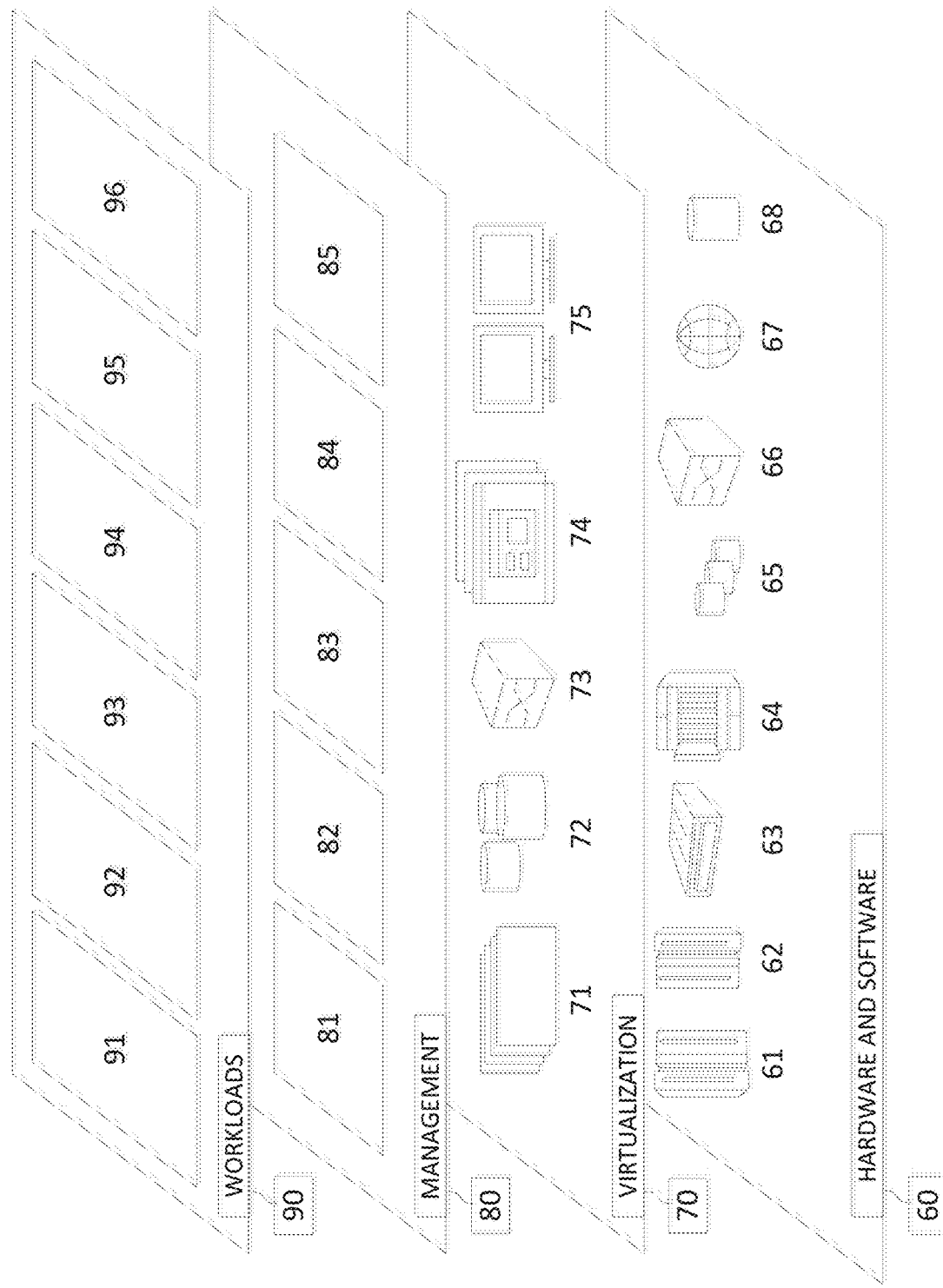
FIG. 8 depicts abstraction model layers, in accordance with an embodiment of the present invention.

Referring now to FIG. 8, a set of functional abstraction layers provided by cloud computing environment 50 (FIG. 4) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and relation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of extracting entity relations, wherein the method comprises:
   receiving, by a computer, one or more preprogrammed questions associated with one or more entities;
   identifying, by the computer, an entity of the one or more entities annotated within a document;
   extracting, by the computer, a portion of content in a proximity to the identified entity;
   determining, by the computer, one or more relations describing an association between the identified entity and one or more other entities within the extracted portion of content based on the extracted portion of content and answering the one or more preprogrammed questions associated with the identified entity; and
   determining, by the computer, whether the received one or more relations correctly describe the association between the identified entity and the one or more other entities by:
      receiving, by the computer, an entity class associated with at least one of the one or more preprogrammed questions;
      determining, by the computer, whether at least one of the received one or more relations correspond to the entity class associated with the at least one of the one or more preprogrammed questions; and
      based on determining that at least one of the received one or more relations correspond to the entity class associated with the at least one of the one or more preprogrammed questions, determining, by the computer, that the at least one of the received one or more relations is correct based on machine learning tools.

2. The method of claim 1, further comprising:
   annotating, by the computer, the document with the determined one or more relations.

3. The method of claim 1, wherein determining the one or more relations describing the association between the identified entity and the one or more other entities within the extracted portion of content further comprises:
   transmitting, by the computer, the extracted portion of content and the one or more preprogrammed questions associated with the identified entity to a question and answer service; and
   receiving, by the computer, the one or more relations based on the question and answer service answering the one or more preprogrammed questions.

4. The method of claim 1, further comprising:
   identifying, by the computer, the one or more other entities within the extracted portion of content; and
   wherein determining the one or more relations describing the association between the identified entity and the one or more other entities within the extracted portion of content is further based on the one or more other entities.

5. The method of claim 1, wherein the extracted portion of content is a sentence containing the identified one or more entities.

6. A computer program product for extracting entity relations, the computer program product comprising:
   one or more non-transitory computer-readable storage media and program instructions stored on the one or more non-transitory computer-readable storage media, the program instructions comprising:
   program instructions to receive one or more preprogrammed questions associated with one or more entities;
   program instructions to identify an entity of the one or more entities annotated within a document;
   program instructions to extract a portion of content in a proximity to the identified entity; and
   program instructions to determine one or more relations describing an association between the identified entity and one or more other entities within the extracted portion of content based on the extracted portion of content and answering the one or more preprogrammed questions associated with the identified entity; and
   program instructions to determine whether the received one or more relations correctly describe the association between the identified entity and the one or more other entities by:
      program instructions to receive an entity class associated with at least one of the one or more preprogrammed questions;
      program instructions to determine whether at least one of the received one or more relations correspond to the entity class associated with the at least one of the one or more preprogrammed questions; and
      based on determining that at least one of the received one or more relations correspond to the entity class associated with the at least one of the one or more preprogrammed questions, program instructions to determine that the at least one of the received one or more relations is correct based on machine learning tools.

7. The computer program product of claim 6, further comprising:
program instructions to annotate the document with the determined one or more relations.

8. The computer program product of claim 6, wherein the program instructions to determine the one or more relations describing the association between the identified entity and the one or more other entities within the extracted portion of content further comprises:
program instructions to transmit the extracted portion of content and the one or more preprogrammed questions associated with the identified entity to a question and answer service; and
program instructions to receive the one or more relations based on the question and answer service answering the one or more preprogrammed questions.

9. The computer program product of claim 6, further comprising:
program instructions to identify the one or more other entities within the extracted portion of content; and
wherein determining the one or more relations describing the association between the identified entity and the one or more other entities within the extracted portion of content is further based on the one or more other entities.

10. The computer program product of claim 6, wherein the extracted portion of content is a sentence containing the identified one or more entities.

11. A computer system for extracting entity relations, the computer system comprising:
one or more computer processors, one or more computer-readable storage media, and program instructions stored on one or more of the computer-readable storage media for execution by at least one of the one or more processors, the program instructions comprising:
program instructions to receive one or more preprogrammed questions associated with one or more entities;
program instructions to identify an entity of the one or more entities annotated within a document;
program instructions to extract a portion of content in a proximity to the identified entity; and
program instructions to determine one or more relations describing an association between the identified entity and one or more other entities within the extracted portion of content based on the extracted portion of content and answering the one or more preprogrammed questions associated with the identified entity; and
program instructions to determine whether the received one or more relations correctly describe the association between the identified entity and the one or more other entities by:
program instructions to receive an entity class associated with at least one of the one or more preprogrammed questions;
program instructions to determine whether at least one of the received one or more relations correspond to the entity class associated with the at least one of the one or more preprogrammed questions; and
based on determining that at least one of the received one or more relations correspond to the entity class associated with the at least one of the one or more preprogrammed questions, program instructions to determine that the at least one of the received one or more relations is correct based on machine learning tools.

12. The computer system of claim 11, further comprising:
program instructions to annotate the document with the determined one or more relations.

13. The computer system of claim 11, wherein the program instructions to determine the one or more relations describing the association between the identified entity and the one or more other entities within the extracted portion of content further comprises:
program instructions to transmit the extracted portion of content and the one or more preprogrammed questions associated with the identified entity to a question and answer service; and
program instructions to receive the one or more relations based on the question and answer service answering the one or more preprogrammed questions.

14. The computer system of claim 11, further comprising:
program instructions to identify the one or more other entities within the extracted portion of content; and
wherein determining the one or more relations describing the association between the identified entity and the one or more other entities within the extracted portion of content is further based on the one or more other entities.

* * * * *